June 22, 1965 R. M. WILMOTTE 3,191,041

PHOTOSENSITIVE COUNTER CIRCUIT OF THE BINARY SCALER TYPE

Filed Sept. 8, 1959

INVENTOR

Raymond M. Wilmotte,

BY Paris, Haskell + Levine

ATTORNEYS 3,191,041

PHOTOSENSITIVE COUNTER CIRCUIT OF THE BINARY SCALER TYPE

Raymond M. Wilmotte, Princeton, N.J.
(4301 Massachusetts Ave. NW., Washington, D.C.)

Filed Sept. 8, 1959, Ser. No. 838,451
19 Claims. (Cl. 250—209)

The present invention relates to electrical counter circuits of the binary scaler type, and more particularly is concerned with such circuits wherein the basic components are couples of photoresponsive elements and variable light sources. The present invention is related to my copending application S.N. 620,831, filed November 7, 1956, and copending application S.N. 607,770, filed September 4, 1956, by myself and Robert L. Carnine, jointly.

In their preferred, and what is presently considered their most practical embodiments for the present purposes, the aforementioned couples comprise photoconductors, such as cadmium sulfide crystals, as the photoresponsive elements, and light transmitting electroluminescent condensers, or cells, as the variable light sources. Photoconductors in the form of suitably activated cadmium sulfide crystals are well known, and such elements can be readily formed possessing relatively wide ranges of photoresponse and time characteristics to illumination. Light transmitting electroluminescent condensers are also well known, and in their more usual form possess the property of emitting light in proportion to the magnitude of A.C. voltage impressed thereacross. These electroluminescent condensers also have the property of a threshold voltage, below which the condensers remain substantially dark or non-luminant.

In accordance with the present invention, by appropriate electrical and luminance coupling of electric signal responsive variable light sources and photoresponsive elements, such as the types above referred to, circuits can be formed broadly functionally equivalent to conventional counters, such as vacuum tube and magnetic counters.

The present invention being directed to counter circuits of the binary scaler type, it comprises the combination of a plurality of units or stages appropriately interrelated or coupled to perform a logical function, particularly the counting of input signals or pulses on the binary scale. In particular, these binary stages are related and are preset by a planned or preestablished assymetry in the several stages, so that the register of binary stages will operate on a radix other than two, and in the preferred embodiment, the register is preset to operate on a radix of ten. Each of the units or stages includes a flip-flop or scale-of-two circuit formed from two variable light sources and two photoresponsive elements appropriately coupled to said light sources optically and electrically, to impart to the unit or stage two stable states—a "0" state with a first of the light sources luminant and the other non-luminant, and a "1" state with said first light source non-luminant and said other luminant. Each such stage is adapted to be switched from its existing stable state to its other stable state upon the application of each input pulse thereto. Further, appropriate photoresponsive carry circuits are associated with each stage so as to couple any input pulse applied to a given stage to the next succeeding stage when the given stage is in the "1" state at the time said input pulse is applied thereto, but not to couple such input pulse to the next stage when the given stage is in the "0" state. Thus, in accordance with usual binary scaler operation, any pulse applied to the input or first stage of the counter is coupled through all successive stages having a "1" state to the first stage of the counter having a "0" state, and in this process, the input pulse causes each stage through which it is coupled and said first "0" state stage to switch to its other stable state.

It is accordingly one object of the present invention to provide a novel counter circuit.

Another object of the present invention is to provide such a circuit utilizing electric signal responsive variable light sources coupled with photoresponsive elements as the basic components of the circuit.

Another object of the present invention is to provide such a circuit utilizing electroluminescent condensers or cells and photoconductors as the basic components of the circuit.

Still another object of the present invention is to provide a circuit which is broadly functionally equivalent to conventional counters, wherein photoconductors and light transmitting electroluminescent condensers are utilized as the basic components of the circuit.

An additional object of the present invention is to provide a counter of the binary scaler type, in which the basic elements or components of the circuit are photoresponsive elements and variable light sources electrically and optically coupled together, particularly where said photoresponsive elements are solid state photoconductors, and said light sources are solid state electroluminescent cells or capacitors.

And a still further object of the present invention is to provide such a counter which is preset to function as a scaler wherein the register operates on a radix of other than two, and preferably ten.

Other objects and advantages of the present invention will become apparent to those skilled in the art from a consideration of the following detailed description of an exemplary specific embodiment thereof, had in conjunction with the accompanying drawing in which.

Figure 1:
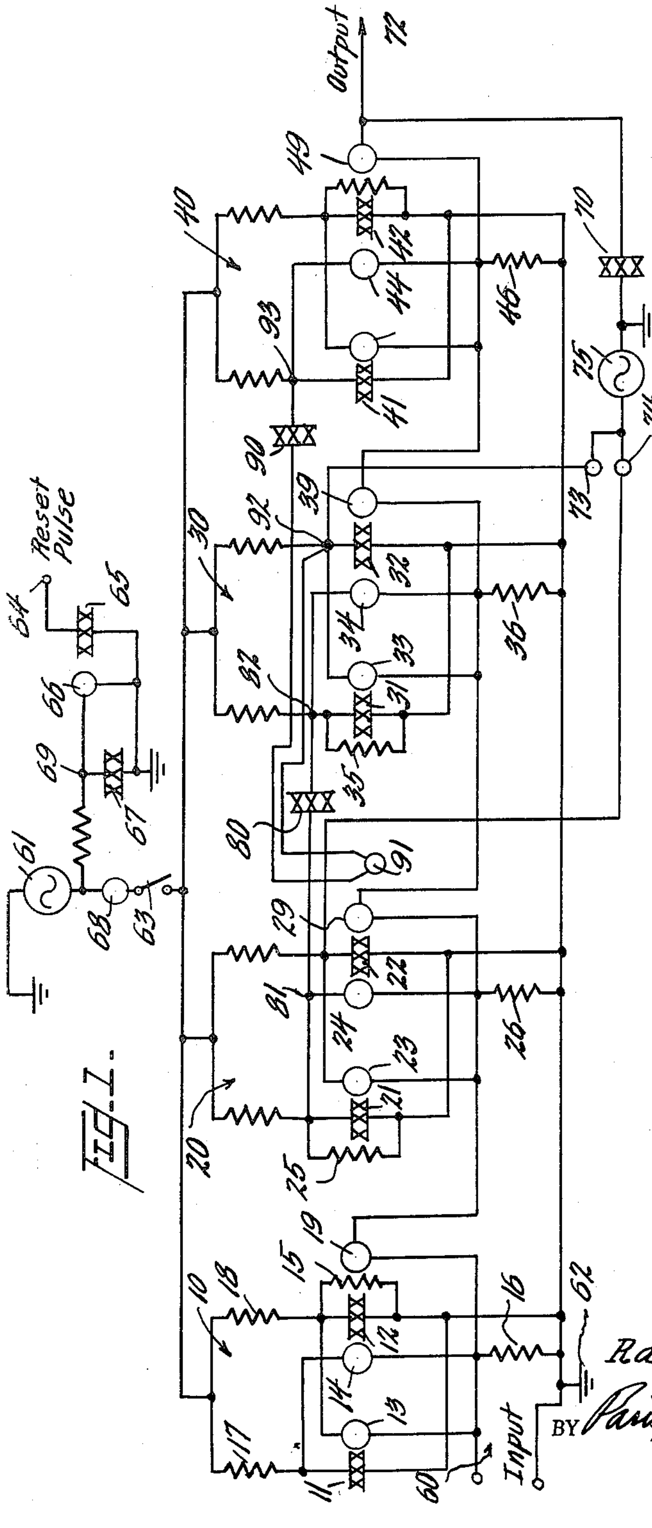
FIG. 1 is a schematic presentation of one embodiment of the invention.

Referring to FIG. 1, the counter there illustrated comprises four identical binary stages 10, 20, 30, and 40. Binary stage 10 comprises two arms in electrical parallel relationship between an A.C. bias source 61 and ground 62. One arm includes the electrical series elements of resistor 17 and electroluminescent cell or capacitor 11, and the other arm includes the electrical series elements of resistor 18 and electroluminescent cell or capacitor 12. In addition photoconductor 14 is connected in electrical parallel relationship with cell 11 with respect to the bias source 61, and is optically coupled to cell 12. Correspondingly, photoconductor 13 is connected in electrical parallel relationship with cell 12 with respect to the bias source 61, and is optically coupled to cell 11. The net work thus far described for stage 10 constitutes a flip-flop circuit, as will become apparent from the subsequent description of its operation. In order to introduce a prescribed or planned asymmetry into this flip-flop circuit, a resistor 15 is connected across cell 12.

Thus, with regard to stage 10, when the bias voltage 61 is initially applied to the circuit, as by closing switch 63 (photoconductor 68 being assumed to be in a low impedance state), stage 10 assumes the stable state of cell 11 luminant and cell 12 extinguished. This result is accomplished by choosing the parameters of the circuit so that when switch 63 is initially closed, the voltages across cells 11 and 12 from the bias source 61 are both in excess of their threshold values. However, because of the unbalance caused by resistor 15, the voltage across cell 11 is greater than that across cell 12, hence cell 11 luminesces more brilliantly than cell 12. As these cells 11 and 12 luminesce, their respective optical couplings with photoconductors 13 and 14 cause the resistances of these photoconductors to decrease. Since cell 11 is luminescing more brilliantly than cell 12, photoconductor 13 tends to decrease to a lower resistance and faster than photoconductor 14. As a result, the decrease in resistance of photoconductor 13 causes the voltage applied across cell 12 to drop below its threshold value, and cell 12 becomes non-luminant. The optical coupling between cell 12 and photoconductor 14 initially has a similar effect on cell 11, but since cell 11 starts from a more brilliant or higher voltage condition than cell 12, cell 11 does not become extinguished and the stage 10 soon reaches the stable state of cell 11 luminant and cell 12 non-luminant or extinguished. With cell 12 extinguished, photoconductor 14 soon attains its full impedance value, and cell 11 attains its full luminance under the bias voltage. This stable state of the binary stage 10 is identified as the "0" state.

Each of the stages 20, 30, and 40 are identical to stage 10, both in structure and response to the bias voltage, except that in stages 20 and 30 the unbalancing resistors 25 and 35 are placed across cells 21 and 31 instead of cells 22 and 32. From the foregoing description it is apparent that these stages therefore respond to the initial application of the bias voltage by each attaining the "1" state, i.e., cells 22 and 32 luminant, and cells 21 and 31 non-luminant. Therefore the structure and response of these stages need not be further specifically described.

Thus, by the initial application of the bias voltage from source 61, stage 10 assumes the "0" state, stage 20 the "1" state, stage 30 the "1" state, and stage 40 the "0" state. By this planned asymmetry of the four stages, the counter is automatically preset with the binary count of 0110, or six. Since the full count of a four stage counter is sixteen, the present counter is therefore preset to count from six to sixteen, and thus function as a decade scaler. As will be subsequently described, the counter is further provided with automatic reset means, so that on reaching the count of sixteen, the counter is reset to a count of six, in readiness to count the next ten input pulses.

The input of pulses to be counted by the counter is effected through input terminals 60. An input pulse at 60 is applied to stage 10 across resistor 16. Considering stage 10 to be in the stable state "0" above-defined, cell 11 is luminant and illuminating photoconductor 13, while cell 12 is non-luminant and hence photoconductor 14 is not illuminated. Photoconductor 13 is therefore a relatively low impedance and photoconductor 14 is a relatively high impedance. Since the input pulse is coupled to each of said cells through its respective photoconductor in electrical series with it with respect to the input source (series circuit 60, 13, 12, to ground, and series circuit 60, 14, 11, to ground), a much greater voltage from the input pulse is passed by photoconductor 13 and applied across cell 12 than is passed by photoconductor 14 and applied across cell 11. The input pulse should be of sufficient value to render cell 12 substantially more luminant than cell 11. The duration of this input pulse is timed in accordance with the time characteristics of the photoconductors, to terminate at a time that renders photoconductor 14 more conductive than photoconductor 13 as a result of the input pulse. This residual unbalance in the flip-flop circuit overrides the unbalance due to resistor 15, and results in a dominant luminance of cell 12 over cell 11, and the establishment of stable state "1" in stage 10, with cell 12 fully luminant from the bias source 61 and cell 11 extinguished, it being shunted by the low impedance of the illuminated photoconductor 14. Similarly, if stage 10 is in the "1" state with cell 12 luminant, from the foregoing it is apparent that upon the application of an input pulse at 60 the stage is caused to switch the "0" state with cell 11 luminant and cell 12 extinguished.

The transfer, carry, or coupling circuit between stage 10 and stage 20 comprises the photoconductor 19 optically coupled to the cell 12. At the time stage 10 was in the "0" state and the input pulse was applied to the counter, as above-described, cell 12 was originally non-luminant. Accordingly photoconductor 19 was a relatively high resistance, and the input pulse was not passed to stage 20 with sufficient amplitude to affect this stage. However, when stage 10 is in the "1" state, the luminance of cell 12 illuminates photoconductor 19, and thus reduces its impedance so that the next pulse in at 60 does affect the stage 20 binary flip-flop. Considering stage 10 to be in the stable state "1," the next pulse in at 60 is applied to stage 10 across resistor 16, and being passed by photoconductor 19, is simultaneously applied to stage 20 across resistor 26. Since stages 20 and 30 are also in the "1" state at the time of application of this second input pulse, this pulse is passed by photoconductor 29 to the input resistor 36 of stage 30, and similarly, passed by photoconductor 39 to the input resistor 46 of stage 40. Since stage 40 was in the "0" state at the time of application of this second pulse, photoconductor 49 is a high impedance, and the input pulse is not passed beyond stage 40. Having been applied to stages 10, 20, 30, and 40, this second input pulse causes all these stages to switch from their existing state to their other stable state, stages 10, 20 and 30 are each switched from "1" state to "0" state, and stage 40, from "0" state to "1" state. The third input pulse at 60 is applied to stage 10 across stage input resistor 16, causing this stage to switch from "0" state to "1" state, but is not passed by photoconductor 19 to stage 20. The fourth input pulse at 60 is applied to stage input resistor 16, causing stage 10 to switch from "1" state to "0" state, and is passed by photoconductor 19 to the stage input of stage 20, causing stage 20 to switch from the "0" state to the "1" state. Photoconductor 29 blocks this fourth pulse from any further effect on the circuit. The further response of this circuit to succeeding input pulses at 60 can be readily ascertained from the foregoing description.

As a result of the ninth input pulse at 60, the counter attains the condition of all stages in the "1" state. Therefore the tenth input pulse applied to input 60 causes stage 10 to switch to the "0" state, is coupled by photoconductor 19 to the stage 20 input where it causes stage 20 to switch to the "0" state, is coupled by photoconductor 29 to the stage 30 input where it causes stage 30 to switch to the "0" state, is coupled by photoconductor 39 to the stage 40 input where it causes stage 40 to switch to the "0" state, and is coupled by photoconductor 49 to the counter output 72. Output 72 may be coupled to the input of a second register, so that the full count of ten attained by the present register may be applied as a unit count in a register of the next higher order.

From the foregoing discussion, the counter would be left with all stages in the "0" state. If this were the case, the second operational cycle of the counter would not operate as a decade scaler in the manner aforedescribed. To continue to operate as a decade scaler, means must be provided to automatically reset the counter to the binary count of 0110, or six. This is effected in the present embodiment by coupling the tenth pulse appearing in the output 72 to electroluminescent condenser or cell 70, luminance coupled to photoconductors 73 and 74. Thus, the output pulse at 72 causes cell 70 to luminesce, resulting in photoconductors 73 and 74 attaining a low impedance. This effect causes an increase in the voltage from source 75 (which could be the same as bias source 61) applied across cells 22 and 32 of sufficient magnitude to cause these cells to luminesce substantially more brilliantly than cells 21 and 31. Photoconductors 24 and 34 are thus rendered more conductive than photoconductors 23 and 33. Accordingly, when the pulse on cell 70 terminates, stages 20 and 30 are caused to obtain the "1" state provided in the planned asymmetry by resistors 25 and 35. The counter is thus reset at a preset count of six (0110), its zero condition, in readiness to count the next ten input pulses for a full counter count of sixteen.

Other circuits than that specifically described may be employed to reset the counter to a desired preset value. For example, instead of applying a voltage pulse to cells 22 and 32 through photoconductors 73 and 74, these photoconductors could be employed to shunt cells 21 and 31, with the same result of causing stages 20 and 30 to obtain a "1" state. Of course, the same circuits and principles for the planned preset asymmetry and automatic reset can be employed for presets other than 0110, to obtain registers having any desired radix.

In the foregoing description of the present invention, it was pointed out that an input pulse at 60 is coupled from one stage to the next by the carry photoconductor only when said one stage had been in a "1" state at the time the input pulse was applied. However, when an input pulse is applied to a "0" state stage, it is switched to a "1" state during the existence of the input pulse. Therefore, the time duration of the input pulses and the response times of the carry circuit photoconductors are chosen so that a given input pulse is terminated before the carry photoconductor of such a switched stage has reached sufficient conductivity to effectively couple the pulse into the next stage.

In addition to the automatic reset above-described, the present counter may at any time be reset to its preset starting value or condition by interrupting the bias supply for a sufficient time to permit all the elements of the circuit to attain their deenergized state, and then reapplying the bias voltage. The circuit will assume the condition prescribed by the planned asymmetry of the several stages, which in the instant illustration is the preset condition of stages 10 and 40 in "0" state, and stages 20 and 30 in "1" state. Assuming photoconductor 68 to be illuminated and in a low impedance state, the foregoing interruption of the bias supply can be accomplished by means of switch 63. Resetting by means of switch 63 can of course be effected without the presence of photoconductor 68 in the circuit.

Photoconductor 68 in series with the bias source 61 can also function as a switch to effect resetting of the counter in response to an electrical reset pulse applied at reset input 64. Normally, no reset pulse is applied at 64, so cell 65 is non-luminant, photoconductor 66 optically coupled thereto is not illuminated and hence is a high resistance, whereby the voltage at 69 is sufficient to render cell 67 luminant. The luminance of cell 67 is applied to photoconductor 68 to render this element a relatively low impedance and result in application of a normal bias voltage to the counter. However, upon the application of a reset pulse to reset input 64, cell 65 luminesces, illuminating photoconductor 66, so that its resultant low resistance shunts and thereby extinguishes cell 67. With the extinguishment of cell 67, photoconductor 68 becomes a high resistance, thereby effectively cutting off the bias voltage to the counter, and causing all the elements thereof to revert to their non-energized state. Upon termination of the reset pulse, cell 65 becomes extinguished, causing photoconductor 66 to regain its non-illuminated high impedance, as a result of which cell 67 again luminesces under the excitation of the bias voltage causing photoconductor 68 to become a low impedance. Thus the bias potential is again effectively applied to the counter, and the counter assumes its zero condition as required by its planned asymmetry.

As thus far described, the counter cyclically indicates by the condition of its binary stages the binary notations from 0110 to 1111, equivalent to the decimal numbers six to 15. The true values of these notations are, however, in terms of actual numbers of pulses applied to the counter input 60, zero to 9. The present invention therefore provides for an optical output which presents the actual number of pulses applied to counter input 60 in binary notation running from 0000 to 1001, equivalent to the decimal numbers zero to nine. This effect is accomplished in the present embodiment by providing the additional elements of electroluminescent cell 80, electroluminescent cell 90, and photoconductor 91. Cell 80 is connected between photoconductors 24 and 34 at 81 and 82, and will luminesce only when these two photoconductors are in opposite state, i.e., one relatively conductive and the other of a relatively high impedance. Since the corresponding elements in the several stages are substantially equal in value, it is apparent that there will be a significant voltage drop across cell 80 only when the photoconductors 24 and 34 are in different resistive states. Cell 90 is connected between photoconductors 33 and 44 at points 92 and 93, and like cell 80, this cell can luminesce only when the latter photoconductors are in different states to provide a significant voltage drop across cell 90. In addition photoconductor 91 is connected in electrical series with cell 90, and is optically coupled with cell 22. Thus, for cell 90 to luminesce, not only must the photoconductors 33 and 44 be in different resistive states, but cell 22 must be luminant to place photoconductor 91 in a low resistance state. One may now consider the optical output of the counter from cells 12, 21, 80, and 90, a luminescing cell being considered the "1" state and an extinguished cell, the "0" state. The following table gives a comparison of the response of stages 10, 20, 30, and 40 with cells 12, 21, 80, and 90 for each pulse in the decade cycle:

| Pulse | Stages | | | | Cells | | | |
|---|---|---|---|---|---|---|---|---|
| | 10 | 20 | 30 | 40 | 12 | 21 | 80 | 90 |
| 0 | 0 | 1 | 1 | 0 | 0 | 0 | 0 | 0 |
| 1 | 1 | 1 | 1 | 0 | 1 | 0 | 0 | 0 |
| 2 | 0 | 0 | 0 | 1 | 0 | 1 | 0 | 0 |
| 3 | 1 | 0 | 0 | 1 | 1 | 1 | 0 | 0 |
| 4 | 0 | 1 | 0 | 1 | 0 | 0 | 1 | 0 |
| 5 | 1 | 1 | 0 | 1 | 1 | 0 | 1 | 0 |
| 6 | 0 | 0 | 1 | 1 | 0 | 1 | 1 | 0 |
| 7 | 1 | 0 | 1 | 1 | 1 | 1 | 1 | 0 |
| 8 | 0 | 1 | 1 | 1 | 0 | 0 | 0 | 1 |
| 9 | 1 | 1 | 1 | 1 | 1 | 0 | 0 | 1 |

Thus cells 12, 21, 80, and 90 provide an optical output or read-out for the counter in conventional binary notations corresponding to a count of one to ten input pulses.

Figure 3:
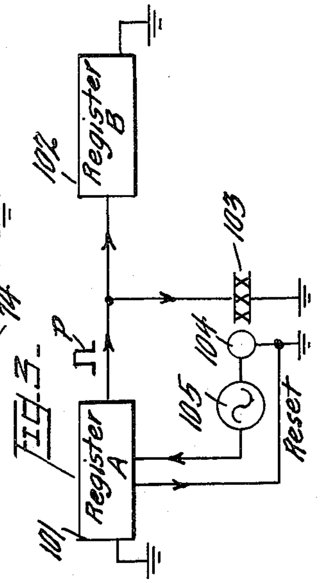
FIGS. 2 and 3 are functional block diagrams and schematic of shift register circuits in accordance with the present invention.
Figure 2:
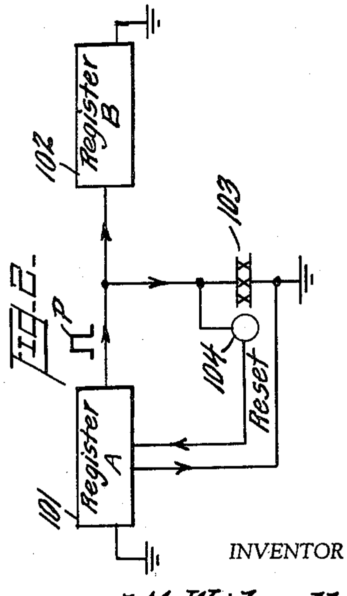

To better illustrate the shift register aspect of the present invention, it is illustrated in combined block diagram and schematic fashion in FIGS. 2 and 3. The shift register function constitutes the application of a pulse indicative of a complete count in one register as a unit input in the register of next higher order, together with resetting the said one register. In FIGS. 2 and 3, two exemplary registers are indicated, register A by numeral 101 and register B by numeral 102. These registers, like that of FIG. 1, are designed to issue a pulse upon reaching a full count for which the register is designed, and register B is intended to represent the next higher order after register A. Thus, when register A reaches its full count, it issues a pulse P which is applied to register B as a unit count in that register. At the same time, in FIG. 2, this pulse P is applied across electroluminescent cell 103 and to photoconductor 104, constituting the reset circuit. Photoconductor 104 and cell 103 are luminance coupled. Thus, pulse P causes cell 103 to luminesce, which in turn reduces the impedance of photoconductor 104, causing the pulse P to be coupled back into the register A to effect a desired reset of this register. If the magnitude of pulse P alone is not sufficient to effect the desired reset operations in the register A, it may, of course, be supplemented by a bias voltage source, not specifically shown.

Instead of feeding back the output pulse P, the reset of register A may be effected by a separate source of voltage as shown in FIG. 3. Here the pulse P, resulting from a full count in register A is applied to register B as a unit input, in the same manner as in FIG. 2. However, in the reset circuit, pulse P is applied only across electroluminescent cell 103. The luminance coupling between cell 103 and photoconductor 104 causes the latter to be reduced in impedance and thus cause a sufficient reset voltage from source 105 to be applied to register A in a manner appropriate to reset this register to its desired initial or zero state. In view of the specific description of the register of FIG. 1 and its reset operation, it is apparent that instead applying an increase in voltage to the reset circuit through source 105, this voltage source may be eliminated, and the reset pulse can be in terms of a decrease in voltage in the reset circuit, as effected merely by a decrease in impedance of photoconductor 104.

Accordingly, by the present invention there is provided a binary readout decade counter, comprised of variable light source-photoresponsive element couples, wherein the counter is of the binary scaler type, having a plurality of binary flip-flop stages, with appropriate carry or coupling circuits interrelating the several stages. Having presented one specific exemplary embodiment of the invention, it is understood that the scope of the invention is not limited thereto, for changes, modifications, and variations will be apparent to those skilled in the art. For example, it will be apparent that the present decade counter can be readily converted in accordance with the principles of the present invention to a trinary counter, quaternary counter, or to any other radix desired, by appropriate preset asymmetry of the binary stages and automatic reset circuitry.

What is claimed is:

1. A binary scaler for cyclically counting a prescribed number of input signals less than the full count of which the scaler is capable and resetting to a prescribed starting condition, comprising: a plurality of stages; each stage including a bi-stable circuit cyclically operable between a first and a second stable state, and an input means for each said circuit; and a carry means in combination with each two successive stages interrelating said two stages; each said circuit comprising voltage responsive variable light means and photoresponsive means electrically and optically coupled to said light means; said light means and photoresponsive means of each said circuit cooperating in response to successive input signals applied to the respective input means to effect said cyclical operation, one cycle of operation for each pair of input signals applied to said respective input means; said first and second stable states being defined by different states of said light means; each said carry means including means optically coupled with said light means of the earlier of its respective two stages for coupling an input signal to the input means of the later of its respective two stages along with the application of an input signal to the input means of said earlier stage, only when said earlier stage is in said second stable state at the time of application of the last-mentioned input signal; and reset means including actuator means coupled to said stages and responsive to the condition of the scaler upon receiving such prescribed number of input signals for resetting the scaler to said prescribed starting condition, said reset means comprising a voltage responsive variable light means controlled by the condition of the scaler to become luminant when the scaler has received said prescribed number of input signals, and photoresponsive means optically coupled to the last-mentioned light means and electrically coupled to at least one stage of the scaler for biasing such stage into that stable state denoted by said prescribed starting condition.

2. A binary scaler as set forth in claim 1, wherein said optically coupled means of each carry means comprises a photoresponsive element.

3. A binary scaler as set forth in claim 2: further including an input means for the scaler associated with the first stage; and wherein all the carry means are connected in electrical series with respect to said input means for the scaler, whereby a signal input to said input means for the scaler is applied to successive circuit input means in accordance with the response of said carry means.

4. A binary scaler for cyclically counting a prescribed number of input signals less than the full count of which the scaler is capable and resetting to a prescribed starting condition, comprising: a plurality of stages; each stage including a bi-stable circuit cyclically operable between a first and a second stable state, and an input means for each said circuit; and a carry means in combination with each two successive stages interrelating said two stages; each said circuit comprising two voltage responsive variable light sources and at least one photoresponsive element electrically coupled to one light source and optically coupled to the other light source; said light sources and photoresponsive element of each said circuit cooperating in response to successive input signals applied to the respective input means to effect said cyclical operation, one cycle of operation for each pair of input signals applied to said respective input means; said first and second stable states being defined by different states of said light sources; each said carry means including means optically coupled with one of said light sources of the earlier of its respective two stages for coupling an input signal to the input means of the later of its respective two stages along with the application of an input signal to the input means of said earlier stage, only when said earlier stage is in said second stable state at the time of application of the last-mentioned input signal; and reset means including actuator means coupled to said stages and responsive to the condition of the scaler upon receiving said prescribed number of input signals for resetting the scaler to said prescribed starting condition, said reset means comprising a voltage responsive variable light means controlled by the condition of the scaler to become luminant when the scaler has received said prescribed number of input signals, and photoresponsive means optically coupled to the last-mentioned light means and electrically coupled to at least one stage of the scaler for biasing such stage into that stable state denoted by said prescribed starting condition.

5. A binary scaler as set forth in claim 4, wherein said optically coupled means of each carry means comprises a photoresponsive element.

6. A binary scaler as set forth in claim 5; further including an input means for the scaler associated with the first stage; and wherein all the carry means are connected in electrical series with respect to said input means for the scaler, whereby a signal input to said input means for the scaler is applied to successive circuit input means in accordance with the response of said carry means.

7. A binary scaler for cyclically counting a prescribed number of input signals less than the full count of which the scaler is capable and resetting to a prescribed starting condition, comprising: a plurality of stages; each stage including a bi-stable circuit cyclically operable between a first and a second stable state, and an input means for each said circuit; and a carry means in combination with each two successive stages interrelating said two stages; each said circuit comprising two voltage responsive variable light sources and two photoresponsive elements, one of said elements being connected electrically across one of said sources and being optically coupled to the other of said sources, the other of said elements being connected electrically to said other of said sources and being optically coupled to said one of said sources, said light sources and photoresponsive elements of each said circuit cooperating in response to successive input signals applied to the respective input means to effect said cyclical operation, one cycle of operation for each pair of input signals applied to said respective input means; said first and second stable states being defined by different states of said light sources; each said carry means including a photoresponsive element optically coupled with said other of said light sources of the earlier of its respective two stages for coupling an input signal to the input means of the later of its respective two stages along with the application of an input signal to the input means of said earlier stage, only when said earlier stage is in said second stable state at the time of application of the last-mentioned input signal; and reset means responsive to the condition of the scaler upon receiving said prescribed number of input signals for resetting the scaler to said prescribed starting condition, said reset means comprising a voltage responsive variable light means controlled by the condition of the scaler to become luminant when the scaler has received said prescribed number of input signals, and photoresponsive means optically coupled to the last-mentioned light means and electrically coupled to at least one stage of the scaler for biasing such stage into that stable state denoted by said prescribed starting condition.

8. A binary scaler as set forth in claim 7: further including an input means for the scaler associated with the first stage; and wherein all the carry means are connected in electrical series with respect to said input means for the scaler, whereby input to said input means for said scaler is applied to successive circuit input means in accordance with the response of said carry means.

9. A binary scaler for cyclically counting a prescribed number of input signals less than the full count of which the scaler is capable and resetting to a prescribed starting condition, comprising: a plurality of stages; each stage including a bi-stable circuit cyclically operable between a first and a second stable state, and an input means for each said circuit; and a carry means in combination with each two succesive stages interrelating said two stages; each said circuit comprising two voltage responsive variable light sources and two photoresponsive elements, one of said elements being connected electrically across one of said sources and being optically coupled to the other of said sources, the other of said elements being connected electrically across said other of said sources and being optically coupled to said one of said sources; said input means comprising means for applying an input signal simultaneously across said one element and said one source in electrical series with respect thereto, and across said other element and said other source in electrical series with respect thereto; said light sources and photoresponsive elements of each said circuit cooperating in response to successive input signals applied to the respective input means to effect said cyclical operation, one cycle of operation for each pair of input signals applied to said respective input means; said first and second stable states being defined by different states of said light sources; each said carry means including a photoresponsive element optically coupled with said other of said light sources of the earlier of its respective two stages for coupling an input signal to the input means of the later of its respective two stages along with the application of an input signal to the input means of said earlier stage, only when said earlier stage is in said second stable state at the time of application of the last-mentioned input signal; and reset means responsive to the condition of the scaler upon receiving said prescribed number of input signals for resetting the scaler to said prescribed starting condition, said reset means comprising a voltage responsive variable light means controlled by the condition of the scaler to become luminant when the scaler has received said prescribed number of input signals, and photoresponsive means optically coupled to the last-mentioned light means and electrically coupled to at least one stage of the scaler for biasing such stage into that stable state denoted by said prescribed starting condition.

10. A binary scaler for optically counting a prescribed number of input signals less than the full count of which the scaler is capable and resetting to a prescribed starting condition, comprising: a plurality of stages; an input means for the scaler associated with the first stage; each stage including a bi-stable circuit cyclically operable between a first and a second stable state, and an input means for each said circuit; and a carry means in combination with each two successive stages interrelating said two stages; each said circuit comprising two voltage responsive variable light sources and two photoresponsive elements, one of said elements being connected electrically across one of said sources and being optically coupled to the other of said sources, the other of said elements being connected electrically to said other of said sources and being optically coupled to said one of said sources; said circuit input means comprising means for applying an input signal simultaneously across said one element and said one source in electrical series with respect thereto, and across said other element and said other source in electrical series with respect thereto; said light sources and photoresponsive elements of each said circuit cooperating in response to successive input signals applied to the respective circuit input means to effect said cyclical operation, one cycle of operation for each pair of input signals applied to said respective circuit input means; said first and second stable states being defined by different states of said light sources; each said carry means including a photoresponsive element optically coupled with said other of said light sources of the earlier of its respective two stages for providing an input signal to the circuit input means of the later of its respective two stages in response to an input signal applied to the circuit input means of said earlier stage, only when said earlier stage is in said second stable state at the time of application of the last-mentioned input signal; all the carry means being connected in electrical series with respect to said signal input means for the scaler, whereby a signal input to said input means for the scaler is applied to successive circuit input means in accordance with the response of said carry means; and reset means responsive to the condition of the scaler upon receiving said prescribed number of input signals for resetting the scaler to said prescribed starting condition, said reset means comprising a voltage responsive variable light means controlled by the condition of the scaler to become luminant when the scaler has received said prescribed number of input signals, and photoresponsive means optically coupled to the last-mentioned light means and electrically coupled to at least one stage of the scaler for biasing such stage into that stable state denoted by said prescribed starting condition.

11. A binary scaler for cyclically counting a prescribed number of input signals less than the full count of which the scaler is capable and resetting to a prescribed starting condition, comprising: a plurality of stages; an input means for the scaler associated with the first stage; each stage including a bi-stable circuit cyclically operable between a first and a second stable state in response to input signals thereto, and an input means for each said circuit; and a carry means in combination with each two successive stages interrelating said two stages; each said circuit comprising a voltage responsive variable light means, and said first and second stable states being defined by different states of said light means; each said carry means including a photoresponsive element optically coupled with said light means of the earlier of its respective two stages for providing an input signal to the circuit input means of the later of its respective two stages in response to an input signal applied to the circuit input means of said earlier stage, only when said earlier stage is in said second stable state at the time of application of the last-mentioned input signal; all the carry means being connected in electrical series with respect to said signal input means for the scaler, whereby a signal input to said input means for the scaler is applied to successive circuit input means in accordance with the response of said carry means; and reset means responsive to the condition of the scaler upon receiving said prescribed number of input signals for resetting the scaler to said prescribed starting condition, said reset means comprising a voltage responsive variable light means controlled by the condition of the scaler to become luminant when the scaler has received said prescribed number of input signals, and photoresponsive means optically coupled to the last-mentioned light means and electrically coupled to at least one stage of the scaler for biasing such stage into that stable state denoted by said prescribed starting condition.

12. A binary scaler for cyclically counting a prescribed number of input signals less than the full count of which the scaler is capable and resetting to a prescribed starting condition, comprising: a plurality of stages; each stage including a bi-stable circuit cyclically operable between a first and a second stable state, and an input means for each said circuit; and a carry means in combination with each two successive stages interrelating said two stages; each said circuit comprising voltage responsive variable light means and photoresponsive means electrically and optically coupled to said light means; said circuits including means for setting selected ones of said stages in said first stable state and the others of said stages in said second stable state, as the starting condition of the scaler, upon initial energization of the scaler; said light means and photoresponsive means of each said circuit cooperating in response to successive input signals applied to the respective input means to effect said cyclical operation, one cycle of operation for each pair of input signals applied said respective input means; said first and second stable states being defined by different states of said light means; each said carry means including means optically coupled with said light means of the earlier of its respective two stages for providing an input signal to the input means of the later of its respective two stages in response to an input signal applied to the input means of said earlier stage, only when said earlier stage is in said second stable state at the time of application of the last-mentioned input signal; and reset means responsive to the condition of the scaler upon receiving said prescribed number of input signals for feeding a signal to selected ones of said circuits for resetting the scaler to said starting condition, said reset means comprising a voltage responsive variable light means controlled by the condition of the scaler to become luminant when the scaler has received said prescribed number of input signals, and photoresponsive means optically coupled to the last-mentioned light means and electrically coupled to said selected ones of said circuits for biasing such circuits into that stable state denoted by said prescribed starting condition.

13. A binary scaler as set forth in claim 12, wherein said optically coupled means of each carry means comprises a photoresponsive element.

14. A binary scaler as set forth in claim 13: further including an input means for the scaler associated with the first stage; and wherein all the carry means are connected in electrical series with respect to said input means for the scaler, whereby a signal input to said input means for the scaler is applied to successive circuit input means in accordance with the response of said carry means.

15. A binary scaler for cyclically counting a prescribed number of input signals less than the full count of which the scaler is capable and resetting to a prescribed starting condition, comprising: a plurality of stages; each stage including a bi-stable circuit cyclically operable between a first and a second stable state, and an input means for each said circuit; and a carry means associated with each two successive stages interrelating said two stages; each said circuit comprising voltage responsive variable light means and photoresponsive means electrically and optically coupled to said light means; said circuits including means for setting selected ones of said stages in said first stable state and the others of said stages in said second stable state, as the starting condition of the scaler, upon initial energization of the scaler; said light means and photoresponsive means of each said circuit cooperating in response to successive input signals applied to the respective input means to effect said cyclical operation, one cycle of operation for each pair of input signals applied said respective input means; said first and second stable states being defined by different states of said light means; each said carry means including means optically coupled with said light means of the earlier of its respective two stages for providing an input signal to the input means of the later of its respective two stages in response to an input signal applied to the input means of said earlier stage, only when said earlier stage is in said second stable state at the time of application of the last-mentioned input signal; and reset means responsive to the condition of the scaler upon receiving said prescribed number of input signals for feeding a signal to selected ones of said circuits for resetting the scaler to said starting condition; and additional voltage responsive variable light means electrically connected between selected ones of said stages and being luminance controlled by the relation of the states of said selected stages for providing in conjunction with selected ones of said circuit light means a notation of the actual count of input signals in binary notation.

16. In combination, a first register of one order for counting input signals thereto, a second register of the next higher order for counting input signals thereto, means for coupling a signal from said first register as an input to said second register upon the first register reaching a prescribed count, and reset means responsive to said last mentioned signal, said reset means comprising a voltage responsive variable light source and a photoresponsive element optically coupled therewith, said light source being electrically connected to said coupling means and becoming luminant in response to said last-mentioned signal, and said element being electrically coupled with selected elements in said first register for resetting said first register to a prescribed condition when illuminated by said light source.

17. In a combination as set forth in claim 16, said element and source being in separate electrical circuits.

18. In a combination as set forth in claim 16, said element and source being in the same circuit.

19. In a combination as set forth in claim 16, a voltage source in electrical series with said element.

References Cited by the Examiner

UNITED STATES PATENTS

| | | | |
|---|---|---|---|
| 2,727,683 | 12/55 | Allen et al. | 250—209 X |
| 2,803,405 | 8/57 | Howell | 235—92 |
| 2,900,502 | 8/59 | Reis | 250—213 |
| 2,959,349 | 11/60 | Marsh et al. | 250—209 X |
| 2,985,763 | 5/61 | Ress | 250—208 |
| 2,996,622 | 8/61 | Acton | 250—213 |
| 3,107,301 | 10/63 | Willard | 250—214 X |

RALPH G. NILSON, *Primary Examiner.*

RICHARD M. WOOD, *Examiner.*